Patented June 10, 1930

1,762,169

UNITED STATES PATENT OFFICE

WILLIAM O. FROHRING, OF SHAKER HEIGHTS, OHIO, AND WILLIAM F. RICHARDS, OF MASON, MICHIGAN, ASSIGNORS, BY MESNE ASSIGNMENTS, TO THE LABORATORY PRODUCTS COMPANY, OF CLEVELAND, OHIO, A CORPORATION OF OHIO

METHOD OF PRODUCING CASEINATES

No Drawing.   Application filed April 20, 1927. Serial No. 185,302.

This invention relates to the method of producing alkaline caseinates, such as are used for improving the quality of an ice cream mix, or for other uses.

Such caseinates are usually made by separating the fat in the form of cream from the milk by a separator, the skim milk being acidified to coagulate the curd and permit the whey to be drained off, the curd being then dissolved in an alkaline solution and dried by some suitable method, such as in a spray drier. These spray driers are large chambers 25 to 30 feet across, into which the material to be dried is sprayed so that its moisture will be distributed and carried away by a current of hot air. The investment in such a drier is large and it is desirable to keep it in operation all the time to produce maximum return. Nevertheless the milk supply at a given factory fluctuates considerably, not only according to the season of the year, being higher in summer than in winter, but during each month, and some adjustment of the various processes carried on in a dairy plant using a spray drier is necessary in order to provide continuous and efficient duty for the drier.

The object of the present invention is to provide an improved method of producing caseinates which not only permits the spray drier or other drier to be operated at maximum efficiency and with the greatest economy, but also improves the quality of the caseinate, as will more fully appear.

Further objects of the invention will be more apparent from the description hereinafter.

According to our improved method casein curd is produced by the usual method, briefly referred to above. The fat is removed by a cream separator, the curd is coagulated by a suitable acid and the whey is drained off, the resulting curd being washed with clear or acidified water to remove the rest of the whey and to further reduce the ash content of the curd. The curd is now drained by enclosing it in burlap bags which are allowed to stand over night or for a suitable period. It is taken out of the bags as a tough cheesy mass and is thoroughly dried by any suitable method. For example, it is run through a chopping mill which shreds or cuts it up and it is then deposited in a layer upon light foraminous screen frames which are mounted in superposed relation in racks and placed in a drier where a current of warm air takes away the moisture. After drying, the casein is ground to a fine powder and may be placed in containers and stored away until convenient to continue with the process. This product is an acid curd unpeptized and will keep indefinitely without deterioration, enabling quantities of such dried curd to be produced during the ordinary operation of the plant and held back during any period when the current operations in the plant demand the use of the spray drier for other purposes.

At any time when the spray drier or other large drier is available for use in drying alkaline caseinate we proceed with the process of producing the same, involving the solution of the dried curd already stored away, the production of alkaline caseinate therefrom and its drying in the spray drier. To this end, from the supply of milk being worked upon at the plant in the ordinary manner for the production of butter or in any manner such as to produce curd, casein curd is separated in the usual manner and is washed with acidified water to reduce its ash content so far as possible. Without drying, this curd is now well dissolved or peptized by adding to it a proper proportion of a suitable alkaline solution, the alkali chosen depending upon the type of caseinate to be produced. It may for example be sodium bicarbonate. When the curd is well dissolved or peptized some of the ground unpeptized curd held in reserve, as before described, is added to the mixture and additional alkali is added to re-act with the ground casein added. The combination is then thoroughly mixed and is run through the spray drier to dry the same, the resulting product being alkaline caseinate.

The relative proportions of fresh undried and peptized casein curd and dried casein curd in this mixture may be varied within wide limits, but in any case the quantity of liquid added to the mass is held as low as possible or, in other words, the alkali used is in more or less concentrated form to avoid the addition of superfluous water, as the result of which the spray drier operates at maximum efficiency due to its operation upon a concentrated alkaline curd and the reduction in the amount of water which it must remove during the drying operation. Again, this operation is usually found to produce alkaline caseinate with lower ash content than heretofore, due to the ability to more thoroughly wash the curd and to drain it in bags. The grain of the caseinate is also improved, due to the increase in concentration, and as a result the particles of caseinate are larger.

As a general rule it is preferable to use fresh curd from the milk available from day to day for this purpose and add enough of the dried casein to make an economic day's run in the spray drier which makes for the greatest efficiency in labor and the full capacity of the spray drier. It also enables the curd from a period of heavy milk supply to be held over for treatment during a period of low supply and is carried out by a preliminary drying in shelf driers or other more simple and less expensive apparatus than the spray drier.

What we claim is:

1. A method of producing alkaline caseinates, which consists of drying the curd as casein, adding such dried casein to wet fresh curd, adding an alkaline solution with minimum water to peptize and dissolve the curd, and spray drying the mixture.

2. A method of producing alkaline caseinates, which consists in separating and drying the curd as casein, grinding to finely divided form, peptizing fresh wet curd with an alkali, mixing the wet peptized curd with the finely divided dry curd and with additional alkali, all in the presence of minimum water, and spray drying the mixture.

In testimony whereof we hereby affix our signatures.

WILLIAM O. FROHRING.
WILLIAM F. RICHARDS.